(12) United States Patent
Hasel et al.

(10) Patent No.: US 8,277,174 B2
(45) Date of Patent: *Oct. 2, 2012

(54) GAS TURBINE ENGINE COMPRESSOR ARRANGEMENT

(75) Inventors: Karl L. Hasel, Manchester, CT (US);
Joseph B. Staubach, Colchester, CT (US); Brian D. Merry, Andover, CT (US); Gabriel L. Suciu, Glastonbury, CT (US); Christopher M. Dye, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,457

(22) Filed: Mar. 13, 2012

(65) Prior Publication Data

US 2012/0171018 A1 Jul. 5, 2012

Related U.S. Application Data

(63) Continuation-in-part of application No. 13/337,354, filed on Dec. 27, 2011, which is a continuation-in-part of application No. 13/294,492, filed on Nov. 11, 2011, which is a continuation of application No. 11/858,988, filed on Sep. 21, 2007, now Pat. No. 8,075,261.

(60) Provisional application No. 61/604,646, filed on Feb. 29, 2012.

(51) Int. Cl.
*F01D 25/28* (2006.01)

(52) U.S. Cl. .................. 415/122.1; 415/213.1

(58) Field of Classification Search ........................ None
See application file for complete search history.

(56) References Cited

U.S. PATENT DOCUMENTS

| | | | |
|---|---|---|---|
| 4,916,894 A * | 4/1990 | Adamson et al. | 60/226.1 |
| 8,075,261 B2 * | 12/2011 | Merry et al. | 415/201 |
| 2008/0149445 A1 | 6/2008 | Kern et al. | |
| 2009/0293445 A1 | 12/2009 | Ress, Jr. | |
| 2010/0219779 A1 | 9/2010 | Bradbrook | |
| 2011/0056208 A1 | 3/2011 | Norris et al. | |

OTHER PUBLICATIONS

Article—"Gas Power Cycle—Jet Propulsion Technology, a Case Study," from MachineDesign.com website, Nov. 1998.
Article—"Gears Put a New Spin on Turbofan Performance," printed from MachineDesign.com website, Nov. 1998.

* cited by examiner

*Primary Examiner* — Richard Edgar
(74) *Attorney, Agent, or Firm* — Carlson, Gaskey & Olds, PC

(57) ABSTRACT

A gas turbine engine includes a fan section, a gear arrangement configured to drive the fan section, a compressor section and a turbine section. The compressor section includes a low pressure compressor section and a high pressure compressor section. The turbine section is configured to drive compressor section and the gear arrangement. An overall pressure ratio, which is provided by a combination of a pressure ratio across said low pressure compressor section and a pressure ratio across said high pressure compressor section, is greater than about 35. The pressure ratio across the low pressure compressor section is between about 3 and about 8 whereas the pressure ratio across the high pressure compressor section is between about 7 and about 15.

19 Claims, 5 Drawing Sheets

GAS TURBINE ENGINE COMPRESSOR ARRANGEMENT

CROSS-REFERENCE TO RELATED APPLICATIONS

This application claims priority to U.S. Provisional Application 61/604,646, filed Feb. 29, 2012, and is a continuation in-part of U.S. patent application Ser. No. 13/337,354, filed on Dec. 27, 2011, and entitled "Gas Turbine Engine Compressor Arrangement," which was a continuation-in-part of U.S. patent application Ser. No. 13/294,492 filed on Nov. 11, 2011, and entitled "Gas Turbine Engine Compressor Case Mounting Arrangement," which was a continuation of U.S. patent application Ser. No. 11/858,988 filed on Sep. 21, 2007 now U.S. Pat. No. 8,075,261, and entitled "Gas Turbine Engine Compressor Case Mounting Arrangement."

BACKGROUND

The present invention relates generally to a gas turbine engine.

Gas turbine engines are known, and typically include a compressor for compressing air and delivering it downstream into a combustion section. A fan may move air to the compressor. The compressed air is mixed with fuel and combusted in the combustion section. The products of this combustion are then delivered downstream over turbine rotors, which are driven to rotate and provide power to the engine.

The compressor includes rotors moving within a compressor case to compress air. Maintaining close tolerances between the rotors and the interior of the compressor case facilitates air compression.

Gas turbine engines may include an inlet case for guiding air into a compressor case. The inlet case is mounted adjacent the fan section. Movement of the fan section, such as during in-flight maneuvers, may move the inlet case. Some prior gas turbine engine designs support a front portion of the compressor with the inlet case while an intermediate case structure supports a rear portion of the compressor. In such an arrangement, movement of the fan section may cause at least the front portion of the compressor to move relative to other portions of the compressor.

Disadvantageously, relative movement between portions of the compressor may vary rotor tip and other clearances within the compressor, which can decrease the compression efficiency. Further, supporting the compressor with the inlet case may complicate access to some plumbing connections near the inlet case.

It would be desirable to reduce relative movement between portions of the compressor and to simplify accessing plumbing connection in a gas turbine engine.

Traditionally, a fan and low pressure compressor have been driven in one of two manners. First, one type of known gas turbine engine utilizes three turbine sections, with one driving a high pressure compressor, a second turbine rotor driving the low pressure compressor, and a third turbine rotor driving the a fan. Another typical arrangement utilizes a low pressure turbine section to drive both the low pressure compressor and the fan.

Recently it has been proposed to incorporate a gear reduction to drive the fan such that a low pressure turbine can drive both the low pressure compressor and the fan, but at different speeds.

SUMMARY

In a feature embodiment, a gas turbine engine has a fan section, a gear arrangement configured to drive the fan section and a compressor section, including both a low pressure compressor section and a high pressure compressor section. A turbine section is configured to drive the compressor section and the gear arrangement. An overall pressure ratio is provided by the combination of a pressure ratio across the low pressure compressor section and a pressure ratio across the high pressure compressor section, and is greater than about 35. The pressure ratio across the low pressure compressor section is between about 3 and about 8. The pressure ratio across the high pressure compressor section is between about 7 and about 15. The fan is configured to deliver a portion of air into the compressor section, and a portion of air into a bypass duct.

In another embodiment according to the prior embodiment, the pressure ratio across the low pressure compressor section is between about 4 and about 8.

In another embodiment according to the preceding embodiment, the pressure ratio across the low pressure compressor section is between about 4 and about 6.

In another embodiment according to the foregoing embodiment, a pressure ratio across the high pressure compressor is between about 8 and about 15.

In another embodiment according to the preceding embodiment, the pressure ratio across the high pressure compressor section is between about 8 and about 10.

In another embodiment according to the foregoing embodiment, an overall pressure ratio is above or equal to about 50.

In another embodiment according to the foregoing embodiment, a bypass ratio is defined as a volume of air passing to the bypass duct compared to a volume of air passing into the compressor section and is greater than or equal to about 8.

In another embodiment according to the foregoing embodiment, the turbine section includes a low pressure turbine having 4 or 5 stages, and wherein the low pressure turbine drives the low pressure compressor.

In another embodiment according to the foregoing embodiment, the turbine section includes a two-stage high pressure turbine, and wherein the high pressure turbine drives the high pressure compressor section.

In another embodiment according to the foregoing embodiment, a pressure ratio across the fan section is less than or equal to about 1.45.

In another featured embodiment, a gas turbine engine has a fan section with a central axis. A compressor case for housing a compressor is included, as is an inlet case for guiding air to the compressor. The compressor case is positioned axially further from the fan section than the inlet case. A support member extends between the fan section and the compressor case, and the support member restricts movement of the compressor case relative to the inlet case. The compressor case includes an upstream compressor case portion and a downstream compressor case portion. The downstream compressor case portion is axially further from the inlet case than the upstream compressor case portion. The support member extends between the fan section and the upstream compressor case portion, and the inlet case is removable from the fan engine separately from the compressor case.

In another embodiment according to the foregoing embodiment, the compressor case includes a low pressure compressor section and a high pressure compressor section, and wherein an overall pressure ratio provided by the combination of the low pressure compressor section and the high pressure compressor section being above or equal to about 35.

In another embodiment according to the previous embodiment, the overall pressure ratio is above or equal to about 40.

In another embodiment according to the previous embodiment, the overall pressure ratio is above or equal to about 50.

In another embodiment according to the previous embodiment, a pressure ratio across the low pressure compressor section is between about 4 and about 8, and a pressure ratio across the high pressure compressor section is between about 8 and about 15.

In another featured embodiment, a gas turbine engine has a fan section, and a compressor section, including both a low pressure compressor section and a high pressure compressor section. An overall pressure ratio being above or equal to about 35 is provided by the combination of the low pressure compressor section and the high pressure compressor section. The overall pressure ratio being provided by a pressure ratio across the low pressure compressor section between about 3 and about 8, and a pressure ratio across the high pressure compressor section between about 7 and about 15 to provide the overall pressure ratio. The fan delivers a portion of air into the compressor section and a portion of air into a bypass duct, and a bypass ratio is defined as a volume of air passing to the bypass duct compared to a volume of air passing into the compressor and being greater than or equal to about 8. A pressure ratio across said fan section being less than or equal to about 1.45.

In another embodiment according to the previous embodiment, the pressure ratio across the low pressure compressor section being between about 4 and about 8.

In another embodiment according to the previous embodiment, the pressure ratio across the low pressure compressor section being about 4 and about 6.

In another embodiment according to the previous embodiment, the pressure ratio across the high pressure compressor being between about 8 and about 15.

In another embodiment according to the previous embodiment, the pressure ratio across the high pressure compressor section being between about 8 and about 10.

The various features and advantages of this invention will become apparent to those skilled in the art from the following detailed description of an embodiment. The drawings that accompany the detailed description can be briefly described as follows.

DETAILED DESCRIPTION

Figure 1:
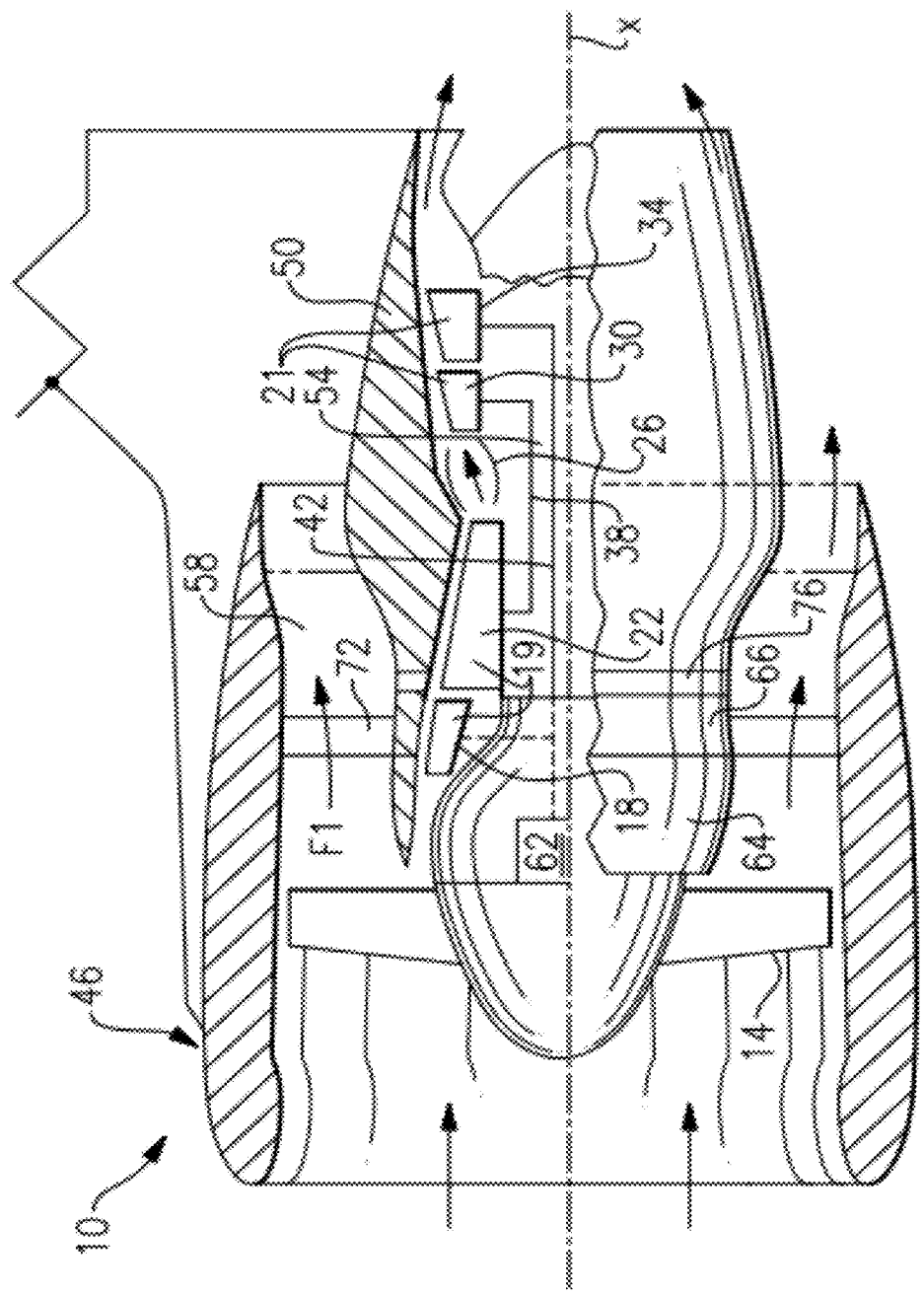
FIG. 1 illustrates a schematic sectional view of an embodiment of a gas turbine engine.

FIG. 1 schematically illustrates an example gas turbine engine 10 including (in serial flow communication) a fan section 14, a compressor section 19 that includes a low pressure (or first) compressor section 18 and a high pressure (or second) compressor section 22, a combustor 26, and a turbine section 21 that includes a high pressure (or second) turbine section 30 and a low pressure (or first) turbine section 34. The gas turbine engine 10 is circumferentially disposed about an engine centerline X. During operation, air is pulled into the gas turbine engine 10 by the fan section 14, pressurized by the compressors 18, 22 mixed with fuel, and burned in the combustor 26. Hot combustion gases generated within the combustor 26 flow through high and low pressure turbines 30, 34, which extract energy from the hot combustion gases. As used herein, a "high pressure" compressor or turbine experiences a higher pressure that a corresponding "low pressure" compressor or turbine.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42. However, the invention is not limited to the two-spool gas turbine architecture described and may be used with other architectures such as a single-spool axial design, a three-spool axial design and other architectures. That is, there are various types of gas turbine engines, many of which could benefit from the examples disclosed herein, which are not limited to the design shown.

The example gas turbine engine 10 is in the form of a high bypass ratio turbine engine mounted within a nacelle or fan casing 46, which surrounds an engine casing 50 housing a core engine 54. A significant amount of air pressurized by the fan section 14 bypasses the core engine 54 for the generation of propulsion thrust. The airflow entering the fan section 14 may bypass the core engine 54 via a fan bypass passage 58 extending between the fan casing 46 and the engine casing 50 for receiving and communicating a discharge airflow F1. The high bypass flow arrangement provides a significant amount of thrust for powering an aircraft.

The gas turbine engine 10 may include a geartrain 62 for controlling the speed of the rotating fan section 14. The geartrain 62 can be any known gear system, such as a planetary gear system with orbiting planet gears, a planetary system with non-orbiting planet gears or other type of gear system. The low speed shaft 42 may drive the geartrain 62. In the disclosed example, the geartrain 62 has a constant gear ratio. It should be understood, however, that the above parameters are only exemplary of a contemplated geared gas turbine engine 10. That is, aspects of the invention are applicable to traditional turbine engines as well as other engine architectures.

The engine 10 in one example is a high-bypass geared aircraft engine. In a further example, the engine 10 bypass ratio is greater than about six (6), with an example embodiment being greater than ten (10), the geared architecture 62 is an epicyclic gear train, such as a planetary gear system or other gear system, with a gear reduction ratio of greater than about 2.3 and the low pressure turbine 34 has a pressure ratio that is greater than about 5. In one example, the geared architecture 62 includes a sun gear, a ring gear, and intermediate gears arranged circumferentially about the sun gear and intermeshing with the sun gear and the ring gear. The intermediate gears are star gears grounded against rotation about the axis X. The sun gear is supported by the low speed shaft 38, and the ring gear is interconnected to the fan 14.

In one disclosed embodiment, the engine 10 bypass ratio is greater than about ten (10:1), the fan diameter is significantly larger than that of the low pressure compressor 18, and the low pressure turbine 34 has a pressure ratio that is greater than about 5:1. Low pressure turbine 34 pressure ratio is pressure measured prior to inlet of low pressure turbine 34 as related to the pressure at the outlet of the low pressure turbine 34 prior to an exhaust nozzle. The geared architecture 62 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by a bypass flow through the bypass passage 58 due to the high bypass ratio. The fan section 14 of the engine 10 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)$^{\wedge}$0.5]. The "Low corrected fan tip speed" as disclosed herein according to one non-limiting embodiment is less than about 1150 ft/second. The above parameters for the engine 20 are intended to be exemplary.

Figure 2:
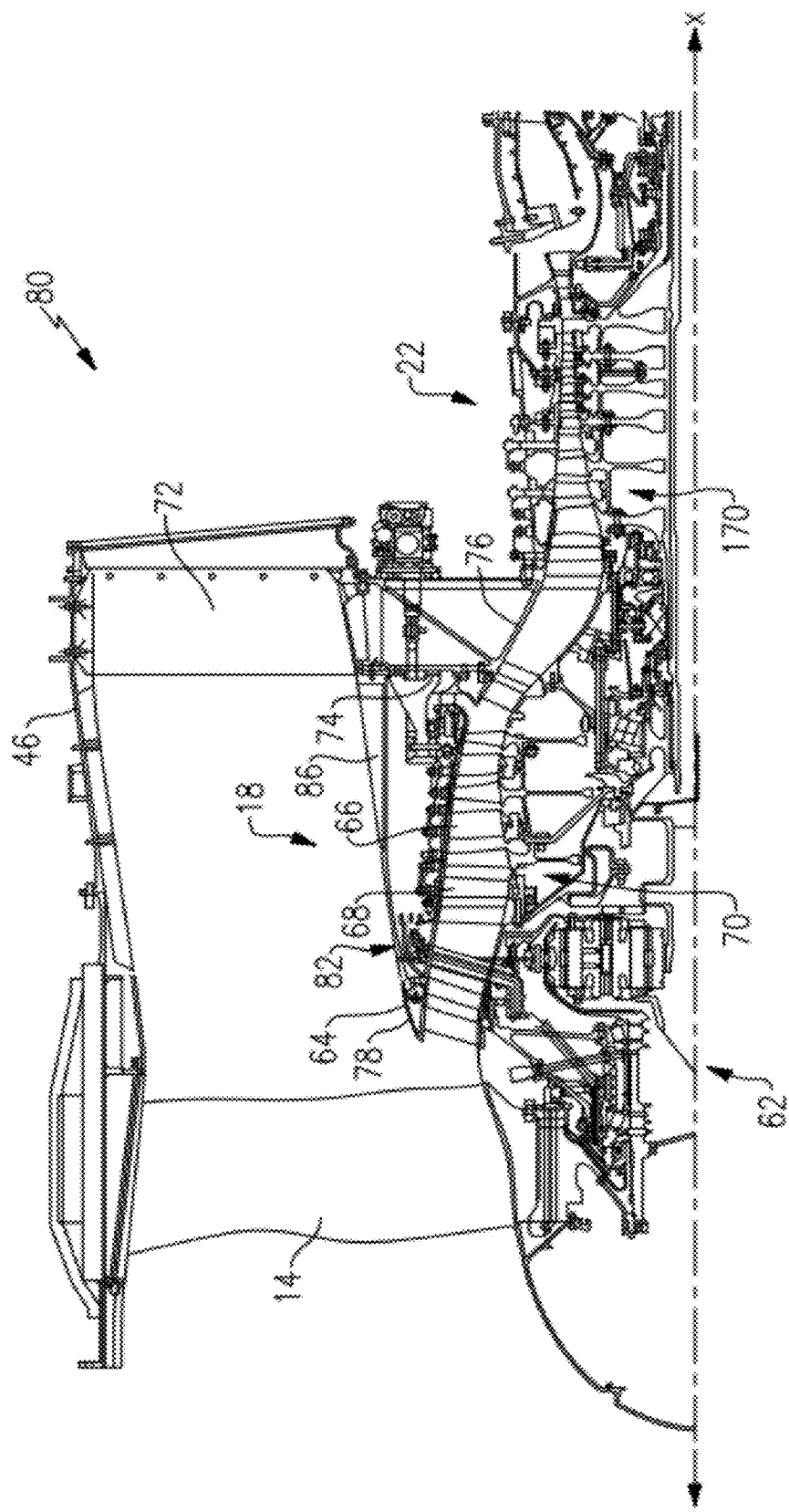
FIG. 2 illustrates a sectional view of a prior art compressor case mounting arrangement. Notably, some aspects are not prior art.

As shown in FIG. 2, the example engine casing 50 generally includes at least an inlet case portion 64, a low pressure compressor case portion 66, and an intermediate case portion 76. The inlet case 64 guides air to the low pressure compressor case 66. The low pressure compressor case 66 in an example prior art gas turbine engine 80 supports a plurality of compressor stator vanes 68. Notably, the low pressure compressor section 18, and the high pressure compressor section 22, and the arrangement of the low rotor 70 and high rotor 170, respectively, are not part of the prior art. The low rotor 70 rotates about the central axis X, and, with the compressor stator vanes 68, help compress air moving through the low pressure compressor case 66. Downstream of the low pressure compressor the air passes into the high pressure compressor section 22, and is further compressed by its rotor 170. The mounting of the compressor as shown in FIG. 2 is prior art, however, the structure of the low pressure compressor section 18 and high pressure compressor section 22, and the rotors 70 and 170 were not part of the prior art.

A plurality of guide vanes 72 secure the intermediate case 76 to the fan casing 46. Formerly, the guide vanes 72 each included at least a rear attachment 74 and a forward attachment 78. The rear attachment 74 connects to an intermediate case 76 while the forward attachment 78 connects to the inlet case 64. The lower pressure compressor case 66 was thus supported through the intermediate case 76 and the inlet case 64.

In the prior art, a plumbing connection area 82 is positioned between the rear attachment 74 and the forward attachment 78. The plumbing connection area 82 includes connections used for maintenance and repair of the gas turbine engine 80, such as compressed air attachments, oil attachments, etc. The forward attachment 78 extends to the inlet case 64 from at least one of the guide vanes 72 and covers portions of the plumbing connection area 82. A fan stream splitter 86, a type of cover, typically attaches to the forward attachment 78 to shield the plumbing connection area 82.

Figure 3:
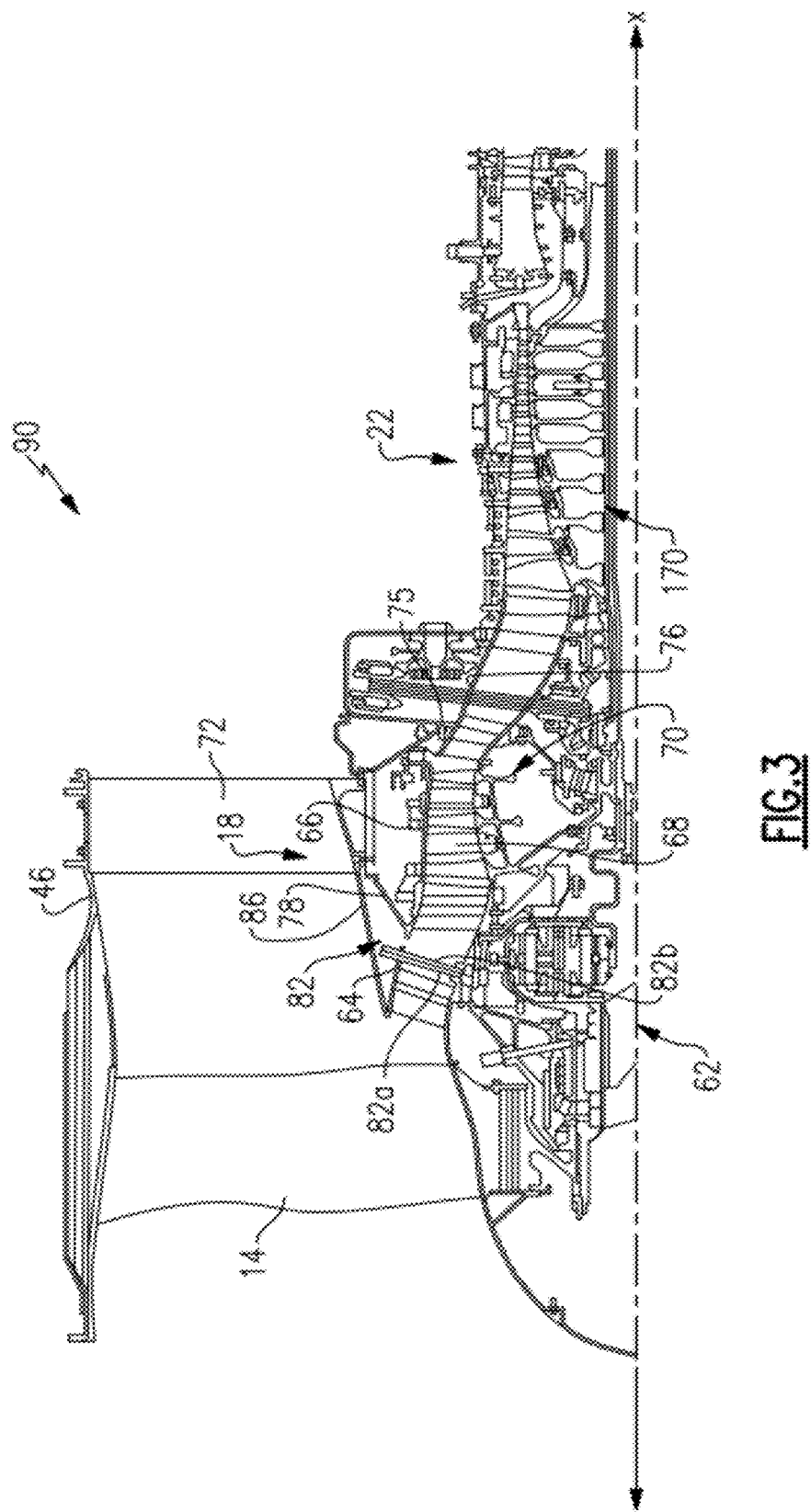
FIG. 3 illustrates a sectional view of an example compressor case mounting arrangement of an embodiment of the current invention.

Referring now to an example of the present invention shown in FIG. 3, in the turbine engine 90, the forward attachment 78 attaches to a front portion of the low pressure compressor case 66. In this example, the forward attachment 78 extends from the guide vane 72 to support the low pressure compressor case 66. Together, the forward attachment 78 and guide vane 72 act as a support member for the low pressure compressor case 66. The plumbing connection area 82 (which includes connections used for maintenance and repair of the gas turbine engine 90, such as compressed air attachments, oil attachments, etc) is positioned upstream of the forward attachment 78 facilitating access to the plumbing connection area 82. In contrast, the plumbing connection area of prior art embodiments was typically positioned between the rear attachment and the forward attachment and the forward attachment typically extended to the inlet case from at least one of the guide vanes, thereby covering portions of the plumbing connection area, which complicated access thereto; this complicated structure was further complicated by a fan stream splitter, a type of cover, that typically was attached to the forward attachment to shield the plumbing connection area.

In the embodiment shown in FIG. 3, an operator may directly access the plumbing connection area 82 after removing the fan stream splitter 86. The plumbing connection area 82 typically provides access to a lubrication system 82a, a compressed air system 82b, or both. The lubrication system 82a and compressed air system 82b are typically in fluid communication with the geartrain 62.

Maintenance and repair of the geartrain 62 may require removing the geartrain 62 from the engine 90. Positioning the plumbing connection area 82 ahead of the forward attachment 78 simplifies maintenance and removal of the geartrain 62 from other portions of the engine 90. Draining oil from the geartrain 62 prior to removal may take place through the plumbing connection area 82 for example. The plumbing connection area 82 is typically removed with the geartrain 62. Thus, the arrangement may permit removing the geartrain 62 on wing or removing the inlet case 64 from the gas turbine engine 90 separately from the low pressure compressor case 66. This reduces the amount of time needed to prepare an engine for continued revenue service, saving an operator both time and money.

Connecting the forward attachment 78 to the low pressure compressor case 66 helps maintain the position of the rotor 70 relative to the interior of the low pressure compressor case 66 during fan rotation, even if the fan section 14 moves. In this example, the intermediate case 76 supports a rear portion of the low pressure compressor case 66 near a compressed air bleed valve 75.

Figure 4:
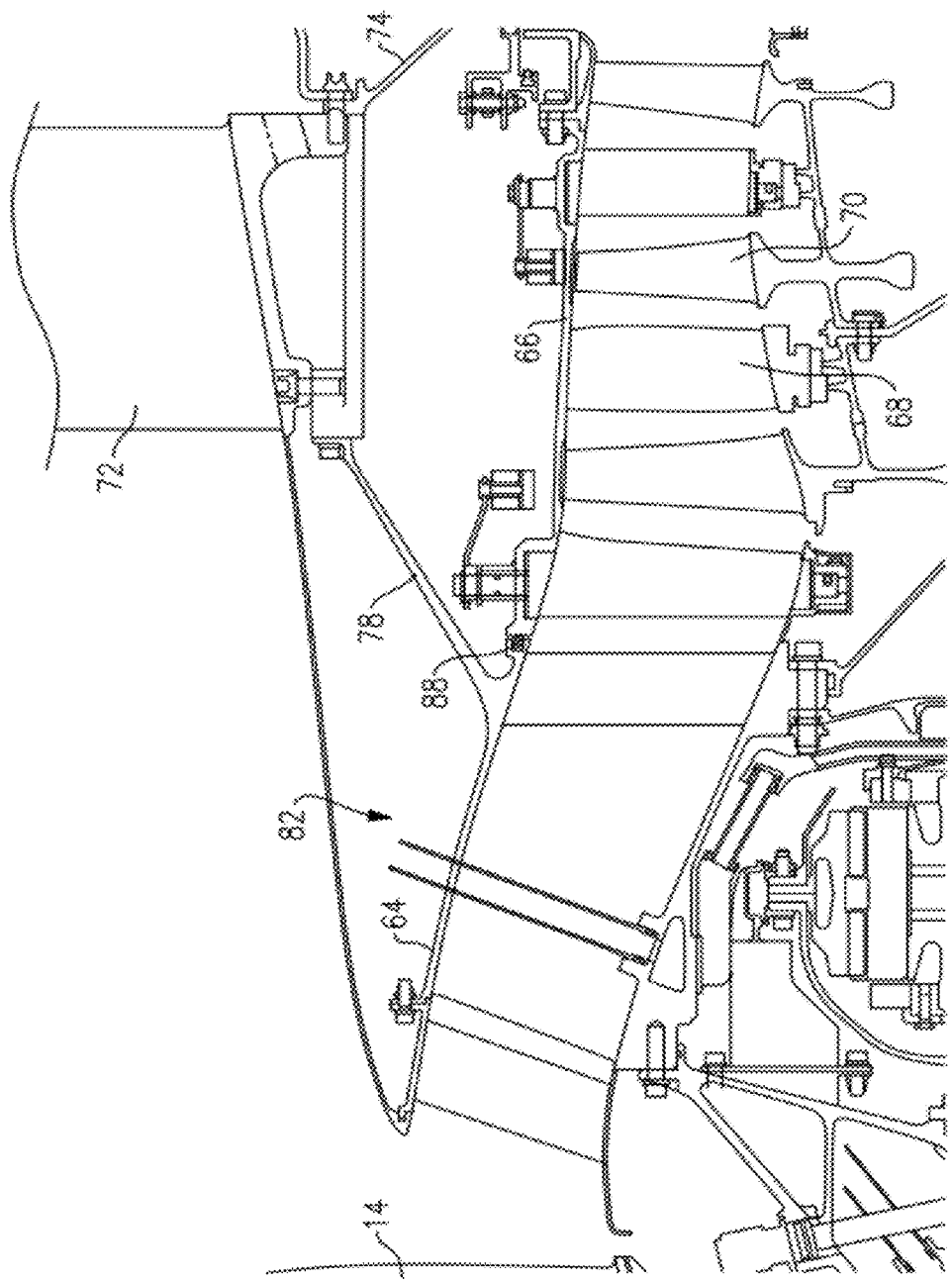
FIG. 4 illustrates a close up sectional view of the intersection between an inlet case and a low pressure compressor case in the embodiment of FIG. 3.

As shown in FIG. 4, a seal 88, such as a "W" seal, may restrict fluid movement between the inlet case 64 and the low pressure compressor case 66. In this example, the seal 88 forms the general boundary between the inlet case 64 and the low pressure compressor case 66, while still allowing some amount of movement between the cases.

Figure 5:
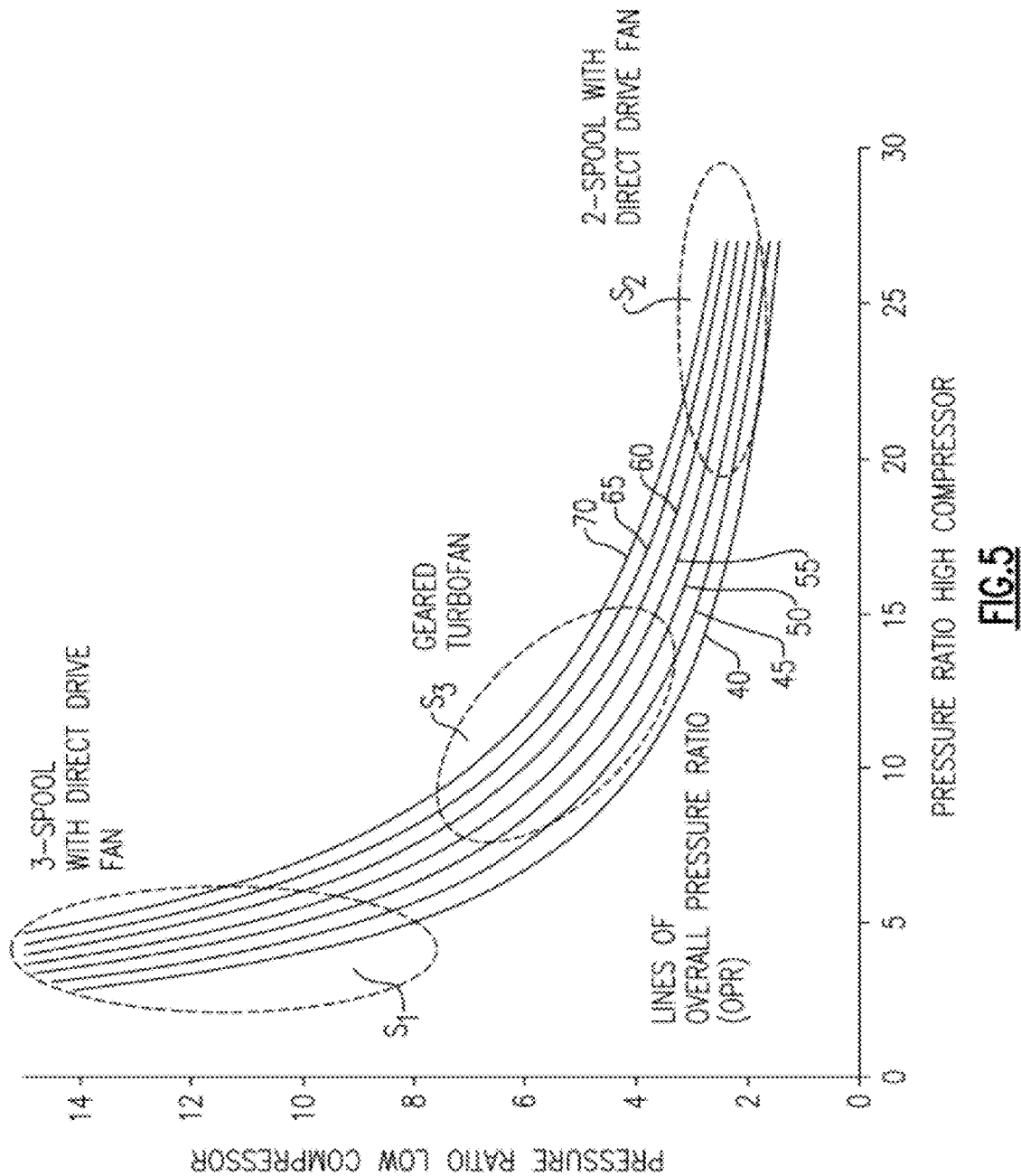
FIG. 5 graphically shows a split in the compression ratios between the low pressure and high pressure compressor sections in a gas turbine engine embodiment.

FIG. 5 shows a novel worksplit that has been invented to improve the fuel burn efficiency of a geared turbofan architecture with a fan 14 connected to the low compressor 18 through a speed reduction device such as a gearbox 62. Since a gear reduction 62 is incorporated between the fan 14 and the low pressure compressor 18, the speeds of the low pressure compressor can be increased relative to a traditional two spool direct drive arrangement. This provides freedom in splitting the amount of compression between the low pressure section 18 and the high pressure section 22 that can be uniquely exploited to improve fuel burn efficiency on the geared turbofan architecture described in FIGS. 1 and 2. This resulting worksplit is distinctly different from historical two and three spool direct drive architectures as shown in FIG. 5.

Notably, while the gear train 62 is shown axially adjacent to the fan 14, it could be located far downstream, and even aft of the low turbine section 34. As is known, the gear illustrated at 62 in FIGS. 2 and 3 could result in the fan 14 rotating in the same, or the opposite direction of the compressor rotors 70 and 170.

It is known in prior art that an overall pressure ratio (when measured at sea level and at a static, full-rated takeoff power) of at least 35:1 is desirable, and that an overall pressure ratio of greater than about 40:1 and even about 50:1 is more desirable. That is, after accounting for the fan 14 pressure rise in front of the low pressure compressor 18, the pressure of the air entering the low compressor section 18 should be compressed as much or over 35 times by the time it reaches the outlet of the high compressor section 22. This pressure rise through the low and high compressors will be referred to as the gas generator pressure ratio.

FIG. 5 shows the way that this high pressure ratio has been achieved in the two prior art engine types versus the Applicant's engine's configuration.

Area $S_1$ shows the typical operation of three spool arrangements discussed the Background Section. The pressure ratio of the low compressor (i.e., the pressure at the exit of the low pressure compressor divided by the pressure at the inlet of the low pressure compressor) is above 8, and up to potentially 15. That is, if a pressure of 1 were to enter the low pressure compressor, it would be compressed between 8 to 15 times.

As can be further seen, the high pressure compressor ratio (i.e., the pressure at the exit of the high pressure compressor divided by the pressure at the inlet of the high pressure compressor) in this arrangement need only compress a very low pressure ratio, and as low as 5 to achieve a combined gas generator pressure ratio of above 35. For example, if the low pressure compressor ratio is 10 and the high pressure compressor ratio is 3.5, the combined overall pressure ratio ("OPR") would be (10)(3.5)=35. In addition, the three spool design requires complex arrangements to support the three concentric spools.

Another prior art arrangement is shown at area $S_2$. Area $S_2$ depicts the typical pressure ratio split in a typical two spool design with a direct drive fan. As can be seen, due to the connection of the fan directly to the low pressure compressor, there is little freedom in the speed of the low pressure compressor. Thus, the low pressure compressor can only do a small amount of the overall compression. As shown, it is typically below 4 times. On the other hand, the high pressure compressor must provide an amount of compression typically more than 20 times to reach an OPR of 40 (or 50).

The $S_2$ area results in undesirably high stress on the high pressure compressor, which, in turn, yields challenges in the mounting of the high pressure spool. In other words, the direct drive system that defines the $S_2$ area presents an undesirable amount of stress, and an undesirable amount of engineering required to properly mount the high pressure spool to provide such high pressure ratios.

Applicant's current low compressor/high compressor pressure split is shown at area $S_3$. The fan is driven at a speed distinct from the low pressure compressor, and a higher compression ratio can be achieved at the low pressure compressor section than was the case at area $S_2$. Thus, as shown, the pressure ratio across the low pressure turbine may be between 4 and 8. This allows the amount of compression to be performed by the high pressure compressor to only need to be between 8 times and 15 times.

The area $S_3$ is an enabling design feature that allows the geared turbofan architecture shown in FIGS. 1 and 2 to achieve a very high gas generator OPR while avoiding the complexities of historical three spool and two spool direct drive architectures. The area $S_3$ is an improvement over both areas $S_1$ and $S_2$. As an example, a 3-4% fuel efficiency is achieved at area $S_3$ compared to area $S_1$. A fuel savings of 4-5% is achieved at area $S_3$, compared to area $S_2$.

In fact, in comparison to a gas turbine engine provided with a gear drive, but operating in the pressure ratios of area $S_2$, there is still a 2% fuel burn savings at the $S_3$ area.

As such, the area $S_3$ reduces fuel burn, and provides engineering simplicity by more favorably distributing work between the hotter high pressure spools and colder low pressure spools.

Stated another way, the present invention provides a combination of a low pressure compressor and a high pressure compressor which together provides an OPR of greater than about 35 and, in some embodiments greater than about 40, in some embodiments greater than about 50, and in some embodiments up to about 70. This high OPR is accomplished by a beneficial combination of a pressure ratio across the low pressure compressor of between about 4 and about 8 coupled with an additional pressure ratio across the high pressure ratio compressor of between about 8 and about 15.

Improved fuel consumption can be further achieved wherein the fan may be low pressure, and have a pressure ratio less than or equal to about 1.45. A bypass ratio, defined as the volume of air passing into bypass passage 58 compared to the volume of air in the core air flow is greater than or equal to about 8 at cruise power. The low pressure compressor may have a pressure ratio of between 3 to 8 and more narrowly 4 to 6, and be powered by a 4 or 5-stage low pressure turbine. The high compressor rotor may have a nominal pressure ratio of between 7 to 15, and more narrowly 8 to 10, and may be powered by a 2-stage high pressure turbine. A gas turbine engine operating with these operational parameters provides benefits compared to the prior art.

Although an embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine comprising:
   a fan section;
   a gear arrangement configured to drive the fan section;
   a compressor section, including both a low pressure compressor section and a high pressure compressor section;
   a turbine section configured to drive the compressor section and the gear arrangement;
   wherein an overall pressure ratio is:
     provided by the combination of a pressure ratio across said low pressure compressor section and a pressure ratio across said high pressure compressor section; and
     greater than about 35,
   wherein the pressure ratio across said low pressure compressor section is between about 4 and about 8,
   wherein the pressure ratio across said high pressure compressor section is between about 7 and about 15; and
   wherein said fan is configured to deliver a portion of air into said compressor section, and a portion of air into a bypass duct.

2. The gas turbine engine as set forth in claim 1, wherein said pressure ratio across said low pressure compressor section being between about 4 and about 6.

3. The gas turbine engine as set forth in claim 1, wherein said pressure ratio across said high pressure compressor being between about 8 and about 15.

4. The gas turbine engine as set forth in claim 3, wherein said pressure ratio across said high pressure compressor section being between about 8 and about 10.

5. The gas turbine engine as set forth in claim 1, wherein said overall pressure ratio is above or equal to about 50.

6. The gas turbine engine as set forth in claim 1, wherein a bypass ratio which is defined as a volume of air passing to said bypass duct compared to a volume of air passing into the compressor section being greater than or equal to about 8.

7. The gas turbine engine as set forth in claim 1, wherein the turbine section includes a low pressure turbine having 4 or 5 stages, and wherein the low pressure turbine drives the low pressure compressor.

8. The gas turbine engine as set forth in claim 1, wherein the turbine section includes a two-stage high pressure turbine, and wherein the high pressure turbine drives the high pressure compressor section.

9. The gas turbine engine as set forth in claim 1, wherein a pressure ratio across said fan section being less than or equal to about 1.45.

10. An arrangement for a gas turbine engine comprising:
a fan section having a central axis;
a compressor case for housing a compressor;
an inlet case for guiding air to said compressor, said compressor case positioned axially further from said fan section than said inlet case;
a support member extending between said fan section and said compressor case wherein said support member restricts movement of said compressor case relative to said inlet case; and
said compressor case includes an upstream compressor case portion and a downstream compressor case portion, said downstream compressor case portion being axially further from said inlet case than said upstream compressor case portion, wherein said support member extends between said fan section and said upstream compressor case portion, and said inlet case is removable from said gas turbofan engine separately from said compressor case.

11. The arrangement as set forth in claim 10, wherein said compressor case includes a low pressure compressor section and a high pressure compressor section, and wherein an overall pressure ratio provided by the combination of said low pressure compressor section and said high pressure compressor section being above or equal to about 35.

12. The arrangement as set forth in claim 11, wherein the overall pressure ratio is above or equal to about 40.

13. The arrangement as set forth in claim 12, wherein the overall pressure ratio is above or equal to about 50.

14. The arrangement as set forth in claim 11, wherein a pressure ratio across said low pressure compressor section is between about 4 and about 8, and a pressure ratio across the high pressure compressor section is between about 8 and about 15.

15. A gas turbine engine comprising:
a fan section;
a compressor section, including both a low pressure compressor section and a high pressure compressor section;
an overall pressure ratio being above or equal to about 35 and being provided by the combination of said low pressure compressor section and said high pressure compressor section, with said overall pressure ratio being provided by a pressure ratio across said low pressure compressor section between about 3 and about 8, and a pressure ratio across said high pressure compressor section between about 7 and about 15 to provide said overall pressure ratio,
wherein said fan delivers a portion of air into said compressor section and a portion of air into a bypass duct,
wherein a bypass ratio defined as a volume of air passing to said bypass duct compared to a volume of air passing into said compressor being greater than or equal to about 8, and
wherein a pressure ratio across said fan section being less than or equal to about 1.45.

16. The gas turbine engine as set forth in claim 15, wherein said pressure ratio across said low pressure compressor section being between about 4 and about 8.

17. The gas turbine engine as set forth in claim 16, wherein said pressure ratio across said low pressure compressor section being between about 4 and about 6.

18. The gas turbine engine as set forth in claim 15, wherein said pressure ratio across said high pressure compressor section being between about 8 and about 15.

19. The gas turbine engine as set forth in claim 18, wherein said pressure ratio across said high pressure compressor section being between about 8 and about 10.

* * * * *